(12) United States Patent
Baumgartner

(10) Patent No.: US 10,207,561 B2
(45) Date of Patent: Feb. 19, 2019

(54) SYSTEM AND METHODS FOR A VEHICLE WITH AN ARTICULATING SUSPENSION EXPLORATION PLATFORM WITH SHOCK DAMPENING

(71) Applicant: Herbert Thomas Baumgartner, Magnolia, TX (US)

(72) Inventor: Herbert Thomas Baumgartner, Magnolia, TX (US)

(*) Notice: Subject to any disclaimer, the term of this patent is extended or adjusted under 35 U.S.C. 154(b) by 36 days.

(21) Appl. No.: 15/475,496

(22) Filed: Mar. 31, 2017

(65) Prior Publication Data
US 2018/0079276 A1 Mar. 22, 2018

Related U.S. Application Data

(60) Provisional application No. 62/396,935, filed on Sep. 20, 2016.

(51) Int. Cl.
| | | |
|---|---|---|
| *B62D 49/08* | (2006.01) |
| *B60G 21/045* | (2006.01) |
| *B60G 3/20* | (2006.01) |
| *B60G 21/055* | (2006.01) |
| *B60G 3/14* | (2006.01) |

(52) U.S. Cl.
CPC ............ *B60G 21/045* (2013.01); *B60G 3/14* (2013.01); *B60G 3/207* (2013.01); *B60G 21/055* (2013.01); *B60G 2200/13* (2013.01); *B60G 2204/129* (2013.01); *B60G 2300/07* (2013.01)

(58) Field of Classification Search
CPC ................ B60G 17/019; B60G 13/14; B60G 2202/413; B60G 2600/182; B60G 2300/60; F03G 7/08

USPC ................... 280/6.154, 6.155, 104
See application file for complete search history.

(56) References Cited

U.S. PATENT DOCUMENTS

| | | | | |
|---|---|---|---|---|
| 4,790,548 A * | 12/1988 | Decelles | ............... | A61G 5/061 180/6.5 |
| 5,904,216 A * | 5/1999 | Furusawa | .............. | B62M 27/02 180/193 |
| 7,389,835 B2 * | 6/2008 | Mulhern | ............... | A61G 5/042 180/22 |
| 7,854,285 B1 * | 12/2010 | Giese | .................... | B62M 27/02 180/190 |
| 9,700,470 B2 * | 7/2017 | Bekoscke | ................ | A61G 5/06 |
| 2003/0176119 A1 * | 9/2003 | Royle | ....................... | B60F 3/00 440/12.54 |
| 2004/0159483 A1 * | 8/2004 | Imamura | ................ | B62M 27/02 180/190 |
| 2006/0169510 A1 * | 8/2006 | Visscher | ................ | B62M 27/00 180/193 |
| 2009/0218781 A1 * | 9/2009 | Sellars | .................. | B60G 9/022 280/124.116 |

(Continued)

OTHER PUBLICATIONS

Herbert Baumgartner and Dr. Nina Robson, Mechanical Design of the Articulated Suspension Exploratory Platform ASEP, Journal: Society of Automotive Engineers International, Paper #:2012-01-1935, Sep. 24, 2012, 7 pages, http://papers.sae.org/2012-01-1935/.

*Primary Examiner* — Toan C To
(74) *Attorney, Agent, or Firm* — Pierson IP, PLLC

(57) ABSTRACT

Embodiments disclose systems and methods for a vehicle with an articulating suspension exploration platform with shock dampening. More specifically, embodiments include a passive articulating of forces by mirroring and chaining bar linkages.

12 Claims, 12 Drawing Sheets

(56) References Cited

U.S. PATENT DOCUMENTS

2010/0108423 A1* 5/2010 Keel ................. B62K 11/04
  180/227
2016/0251043 A1* 9/2016 Muehlfeld ............ B62M 27/02
  180/193

* cited by examiner

SYSTEM AND METHODS FOR A VEHICLE WITH AN ARTICULATING SUSPENSION EXPLORATION PLATFORM WITH SHOCK DAMPENING

CROSS-REFERENCE TO RELATED APPLICATIONS

This application claims a benefit of priority under 35 U.S.C. § 119 to Provisional Application No. 62/396,935 filed on 20 Sep. 2016, which is fully incorporated herein by reference in their entirety.

TECHNICAL FIELD

Embodiments disclose systems and methods for a vehicle with an articulating suspension exploration platform with shock dampening. More specifically, embodiments include a passive articulating of forces by mirroring and chaining bar linkages.

BACKGROUND

A shock absorber is a mechanical or hydraulic device designed to absorb and dampen shock impulses. A shock absorber converts kinetic energy of the shock into another form of energy, such as heat, which is then dissipated.

In a vehicle, shock absorbers reduce the effect of traveling over rough ground, leading to an improved ride quality and vehicle handing. Typically, shock absorbers use valving of oil and gasses to absorb excess energy from springs. Spring rates are chosen by manufactures based on a plurality of factors, including the weight of the vehicle.

Conventional shock absorbers in vehicles use a single pivot, such that the wheels effectively move in an arc. Additionally, conventional shock absorbers limit the vertical displacement of wheels to be between 0.5 to 1.5 times the wheel diameters. These deficiencies limit wheel contact and impact on the vehicle while the vehicle climbs obstacles.

Accordingly, needs exist for a vehicle with a passive suspension linkage system, wherein the linkage system includes a rear stabilizer bar configured to couple a left and right side of a vehicle, and mirrored and chained linkage bars.

SUMMARY

Embodiments described a vehicle with an articulating suspension exploration platform with shock dampening. More specifically, embodiments include a passive articulating of forces by mirroring and chaining bar linkages. Embodiments are configured to improve lateral stability, linear motion, and obstacle climbing capacity for the vehicle's suspension by transferring forces applied to a vehicle's wheel across a length and width of the vehicle.

Embodiments may include a plurality of links coupled to a chassis, a rear stabilizer bar, and a rear stabilizer support. The chassis of the vehicle may have a linear, slightly forward leaning trajectory (or have a trajectory that is in parallel to a flat floor surface).

Each of the plurality of links may be associated with a different wheel of the vehicle, wherein each of the links is configured to independently articulate responsive to receiving force from an obstacle, surface, etc. In embodiments, an independent link may pivot and be articulated before transferring the forces to the chassis and other links. Responsive to the independent link being articulated, a first shock dampener, such as a spring, linear actuator, etc., that is a floating shock absorber associated with the independent link may dampen the force associated with the independent, articulating link. The first shock dampener may also be a passive system that allows for independent dampening at each wheel before reactive forces are passed to the other wheels, which in a conventional four wheeled vehicle may be the other three wheels. The dampened force may be transferred by the first shock dampener to a mirrored link on the same side of the vehicle through a front bar and the shock dampener. The shock dampener associated with the mirrored link may work in an opposite phase with the independent link. The first shock dampener may be a first type of spring, with a first length, width, and number of coils. Alternatively, the first shock dampener may be a linear actuator configured to raise and lower the chassis, or level a single side of the vehicle if the other side of the vehicle is positioned on an incline.

The rear stabilizer bar may mechanically connect a right and left side of the vehicle, wherein the rear stabilizer bar is configured to dampen forces applied to independent link to the rest of the vehicle. Furthermore, the rear stabilization bar may be configured to reduce the risk of the chassis flipping forward or backward as the vehicle is accelerated forward or backward. In embodiments, the rear stabilizer bar may be configured to control the proportion of transfer of motion and force between the right and left side of the vehicle to increase the vertical articulation of any of the bar linkages. In embodiments, shock dampeners associated with the rear stabilizer may be a second type of spring, linear actuator, etc., with second lengths, widths, and number of coils, wherein the second type of spring may be wider and longer than the first type of spring. Alternatively, the second type of linear actuator may be configured to apply and/or receive more force than the first type of linear actuator.

The rear stabilizer support may be configured to be a pivot for the rear stabilizer. The rear stabilizer support may be a wishbone that is configured to counter a moment produced around a rear most bar through the chassis.

Embodiments may be configured to vertically displace a wheel at a greater distance than two times the wheel diameter. This may allow the vehicle to traverse much larger obstacles with the same size wheel. Furthermore, the exact trajectory of the articulation of each wheel may be optimized to follow a very near vertical path. In other embodiments, the each wheel may follow an arched path. The vertical trajectory may be important for climbing stairs or other flat faced obstacles and also insures that the maximum wheel displacement is achieved.

Furthermore, by isolating the front and rear sets of links via shock absorbers or linear actuators, the shock absorbers and/or linear actuators can be added without taking away the passive articulating of the system while climbing an obstacle.

In embodiments, as a front wheel initiates a climb, the rear wheel on the same side of the vehicle may roll forward towards the front of the vehicle relative to the chassis. This dynamic trangulation may be configured to add stability though a transfer phase of forces and help distribute ground pressures on each of the wheels of the vehicle.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention. The invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
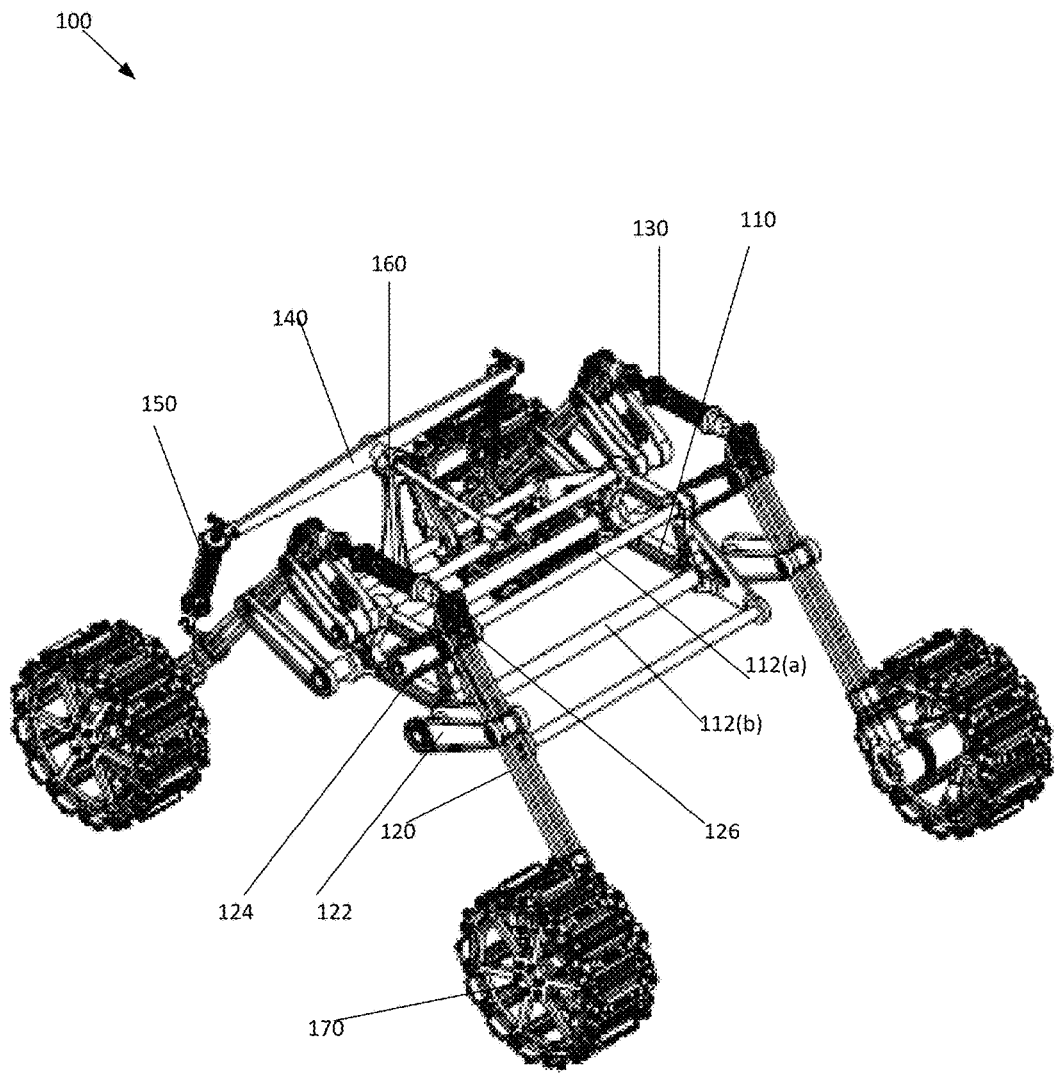
FIG. 1 depicts a perspective view of a vehicle with an articulating suspension exploration platform with shock dampening, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

FIG. 1 depicts a perspective view of a vehicle 100 with an articulating suspension exploration platform with shock dampening, according to an embodiment. Vehicle 100 may include a chassis 110, linkages 120, first shock dampeners 130, rear stabilizer bar 140 with second shock dampeners 150, and rear stabilizer support 160.

Chassis 110 may be a frame of vehicle 100, which is configured to support the other elements of vehicle 100. Chassis 110 may be substantially symmetrical in shape, and may be substantially trapezoidal in shape. Chassis 110 may be include a plurality of orifices configured to receive linkage bars 112, such that the linkage bars 112 may extend through the orifices to have ends positioned outside of the chassis 110. Each of the the linkages 120 may be configured to pivot about two linkage bars 112 that are coupled with chassis 110. Thus, chassis 110 includes a double link design. In embodiments, upper orifices and corresponding linkage bars 112 may be positioned more proximate to a center of a longitudinal axis of the chassis 110 than lower orifices and corresponding linkage bars 112. The positioning of the orifices and linkage bars 112 may be configured to allow vertical displacement of linkages 120 without vehicle 100 tipping over. Furthermore, the vertical and horizontal offsets of the upper linkage bar 112(a) from a lower linkage bar 112(b) may be configured to more efficiently and effectively disperse forces applied to linkages 120.

Linkages 120 may be shafts, tubes, conduits, etc. that are configured to couple wheels 170, shock dampeners 130, and chassis 110. A vehicle 100 may include four identical linkages 120, wherein each linkage 120 is coupled with an independent wheel 170. Each linkage 120 may include a first arm 122, second arm 124, and dampener coupling mechanism 126.

The first arm 122 and second arm 124 may form two pivot points allowing linkage 120 to vertically articulate in a controlled linear direction, while dampening forces upon linkage 120. First ends of first arm 122 and second arm 124 may be configured to be coupled with linkage 120, while second ends of first arm 122 and second arm 124 may be configured to be coupled with linkage bars 112. A second end of first arm 122 may be positioned closer to a distal end of linkage 120 than a second end of second arm 122, and a second end of second arm 124 may be positioned closer to a proximal end of linkage 120 than the second end of first arm 122. By having multiple arms coupled to linkage 120 and linkage bars 112, linkage 120 may articulate freely at each connection point via the different linkage bars 112(a) 112(b), while limiting the torque at a point of attachment to the linkage bars 112. In embodiments, the length of first arm 122 may be longer than the length of second arm 124. In embodiments, the arms and/or linkages of vehicle 100 may be telescopic, such that the lengths may be changed, wherein the rear arms and/or linkages may have different lengths than the front arms and/or linkages. For example, in an embodiment with shorter rear lengths for the arms and/or linkages, vehicle 100 may tilt rearward. This may enable vehicle 100 to have a more rearward center of gravity enable vehicle 100 to travel at higher speeds.

Dampener coupling mechanism 126 may be configured to couple linkage 120 to a shock dampener 130. In embodiments, a front, first linkage 120 may be configured to couple with a first end of shock dampener 130. While a rear, second linkage 120 may be configured to couple with a second end of shock dampener 130. Dampener coupling mechanism 126 may be angled, such that dampener coupling mechanism 126 is positioned tangential to a longitudinal axis of linkage 120. This angling of dampener coupling mechanism 126 may be configured to allow reaction forces of the front and rear wheel linkages upon shock dampener 130 to be mirrored.

Shock dampener 130 may be mechanical or hydraulic device (i.e. a spring or linear actuator) configured to absorb and damp shock impulses, such as a wheel 170 of vehicle 100 interacting with an obstacle, stairs, ground surface, etc. Shock dampener 130 may be configured to convert kinetic energy caused by the interacting of a wheel or corresponding linkage 120 to another form of energy and/or assist in the transfer of kinetic energy to other elements of vehicle 100. Shock dampener 130 may be a first type of spring or linear actuator, with a first length, width, and number of coils. Shock dampener 130 may also be a passive system that allows for independent dampening at each wheel 170 before reactive forces are passed to the other three wheels. Additionally, shock dampener 130 may be a floating shock absorption device with a first end of shock dampener 130 coupled with a front linkage 120, and a second end of shock dampener 130 coupled with a rear linkage 120. This may lead to the forces impacting the first and second ends of shock dampener 130 to be passively mirrored. Shock dampener 130 may be configured to interface with a square tubing of linkage 120. Linkage 120 may include an adapter base that has a length to minimize the binding of the full linkage system to maximize wheel displacement.

Rear stabilizer bar 140 may be a floating shock absorption device that is configured to connect a right and left side of the vehicle 100. Rear stabilizer bar 140 may include a first end that is coupled to a right, rear linkage 120, and a second end that is coupled to a left, rear linkage 120. Rear stabilizer bar 140 may be configured to dampen forces applied to independent linkages 120 to the rest of the vehicle 100. Furthermore, rear stabilizer bar 140 may be configured to reduce the risk of the chassis 110 flipping forward or backward as the vehicle 100 is accelerated forward or backward. In embodiments, rear stabilizer bar 140 may be configured to control the proportion of transfer of motion and force between the right and left side of the vehicle to increase the vertical articulation of any of the linkages 120. In embodiments, rear stabilizer bar 140 may be positioned outside of chassis 110, and may be configured to apply downward force due to gravity of the rear wheels of vehicle 100. Therefore, the rear end of vehicle 100 may weigh more than the front end of vehicle 100, which may assist in the stabilization of vehicle 100.

A first end of rear stabilizer bar 140 may be include a second shock dampener 150, and a second end of rear stabilizer bar 140 may also include a second shock dampener 150. In operation, the second shock dampeners 150 may be configured to transfer forces to linkages 120 to opposite sides of vehicle 100 responsive to articulating a first linkage 120 on a first side of vehicle 100. The second shock dampener 150 may be a second type of spring or linear actuator, with a first length, width, and number of coils. In embodiments, second shock dampeners 150 may be positioned substantially perpendicular to a surface below vehicle 100, while first shock dampeners 150 may be positioned substantially in parallel to the surface below vehicle 100.

Rear stabilizer support 160 may be a device that has a front end that is configured to be coupled with the front linkages 120 via a linkage bar 112 extending through the rear stabilizer support 160, chassis 110, and linkages 120. Rear stabilizer bar 140 may have a second end that is configured to couple with rear stabilizer bar 140 via a "T-connector." The T-connector may be configured to triangulate a top portion of the rear stabilizer support 160 to rear stabilizer bar 140, and to be a pivot point for rear stabilizer bar 140. The geometry of rear stabilizer support 160 may be configured to counter a moment produced around a rear most bar.

In embodiments, responsive to a wheel 170 associated with a first linkage 120 interacting with an obstacle, stair, and/or other surface, the first linkage 120 may articulate independently from the other linkages 120 in the system 100, without a force initially being transferred to other components of vehicle 100. Accordingly, the first linkage 120 may pivot to be vertically raised. Responsive to the first linkage being articulated and vertically raised, a corresponding shock dampener 130 may compress or be elongated, to dampen the force associated with the linkage 120 being articulated. Therefore, the floating shock of shock dampener 130 may dampen the forces of an independent wheel before the reactive forces are passed to the other linkages 120. The shock dampener 130 may transfer the dampened force to a mirrored linkage 120 on the same side of the vehicle 100, wherein the force applied to the mirrored linkage 120 via the shock dampener 130 may be in opposite phase to that applied to the first linkage 120. The rear stabilizer bar 140 may then transfer the forces to the opposite side of the vehicle 100 utilizing second shock dampeners. This may allow a linkage 120 to vertically articulate more than two times a diameter of the corresponding wheel without tipping.

Figure 2:
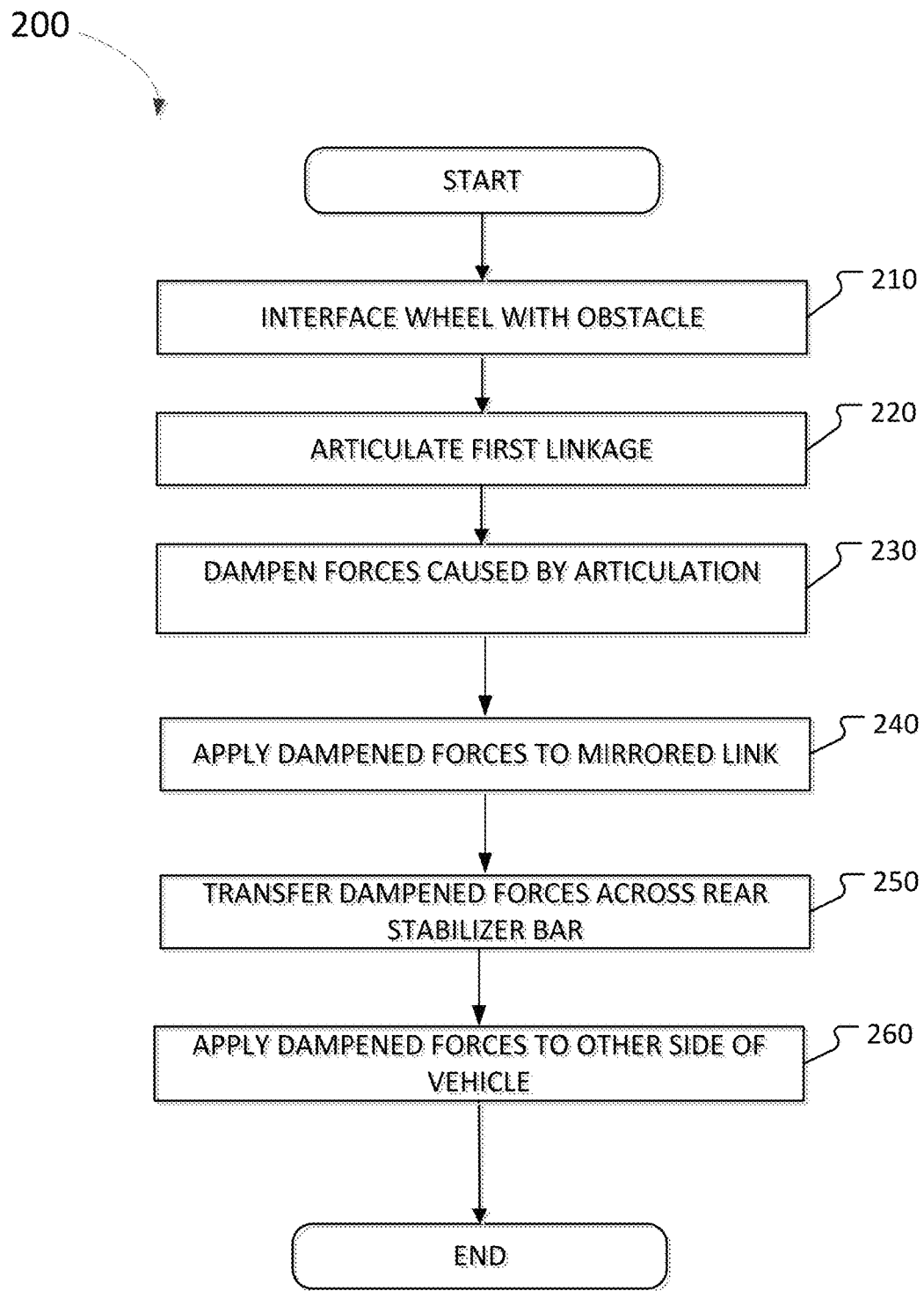
FIG. 2 illustrates a method for independently articulating a linkage of a vehicle.

FIG. 2 illustrates a method 200 for independently articulating a linkage of a vehicle. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and are described below is not intended to be limiting.

At operation 210, a wheel associated with a first linkage may interact with a vertical face of a surface. For example, a front right wheel may begin to climb a vertical face of a stair.

At operation 220, the first linkage may pivot about two points coupled with a chassis to vertically raise the linkage. The two pivot points may allow the first linkage to be raised in a controlled and smooth process about two points.

At operation 230, the forces caused by pivoting the first linkage may be dampened by a shock dampener, which is positioned between the first linkage and a mirrored linkage on the same side of the vehicle as the first link. For example, the second linkage may be a rear right wheel.

At operation 240, the dampened forces may be applied to the rear right wheel associated with the mirrored link.

At operation 250, the dampened forces may be passed across a longitudinal axis of the vehicle via a rear stabilizer bar with two shock dampeners, wherein the shock dampeners are coupled to the mirrored links at the rear of the vehicle.

At operation 260, the forces further dampened by the rear stabilizer bar may be applied to the linkages on the opposite side of the vehicle. For example, the forces may be applied initially to a rear left wheel via the second shock dampeners, and then passed onto a front left wheel of the vehicle via the first shock dampeners.

Figure 4:
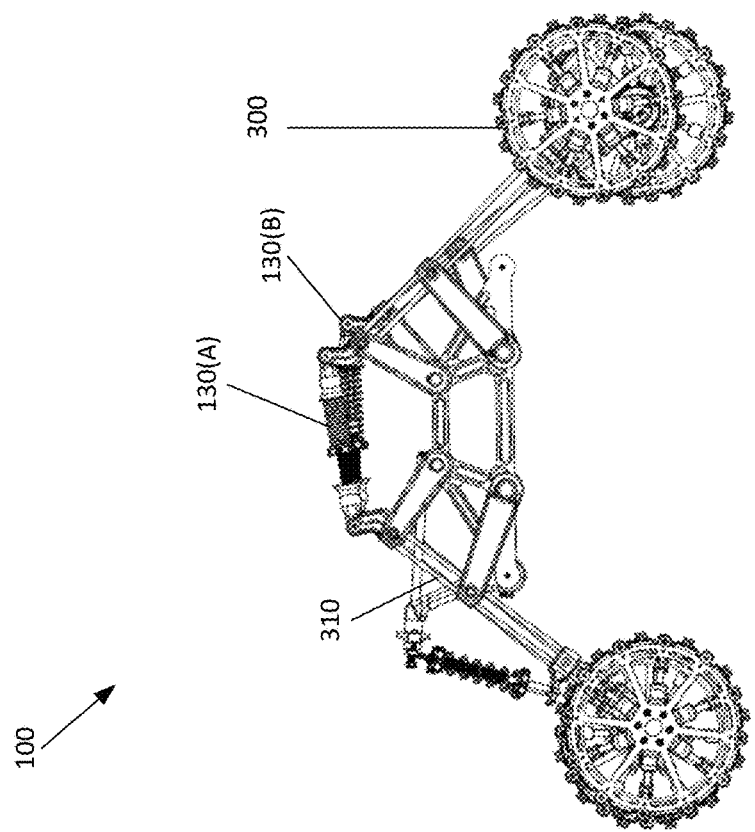
FIGS. 3 and 4 depict an embodiment of a vehicle with an articulating suspension exploration platform with shock dampening, according to an embodiment.
Figure 3:
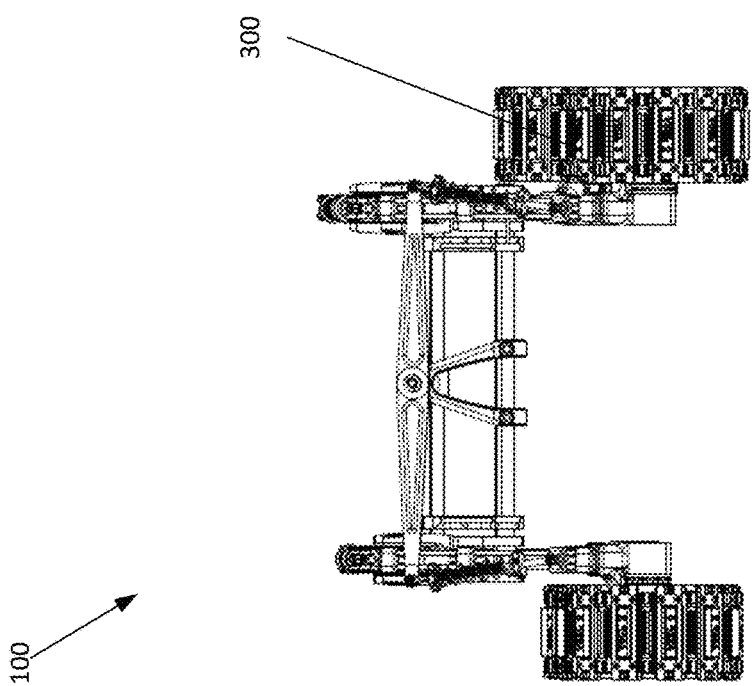

FIGS. 3 and 4 depict an embodiment of a vehicle 100 with an articulating suspension exploration platform with shock dampening, according to an embodiment.

As depicted in FIGS. 3 and 4, a first linkage 120 may be vertically raised at least two times the diameter of a wheel 300 associated with the first linkage 120. As further depicted in FIGS. 3 and 4, a shock dampener 130(A) may couple the first linkage 120 with a mirrored linkage 310 positioned on the same side of vehicle 100 as first linkage 120. Responsive to first wheel 300 having forces acted upon it that cause first wheel 300 to rise, shock dampener 130(A) may apply forces to mirrored linkage 310 without shock dampener 130(B) initially effecting the linkages on the second side of vehicle 100.

Figure 5:
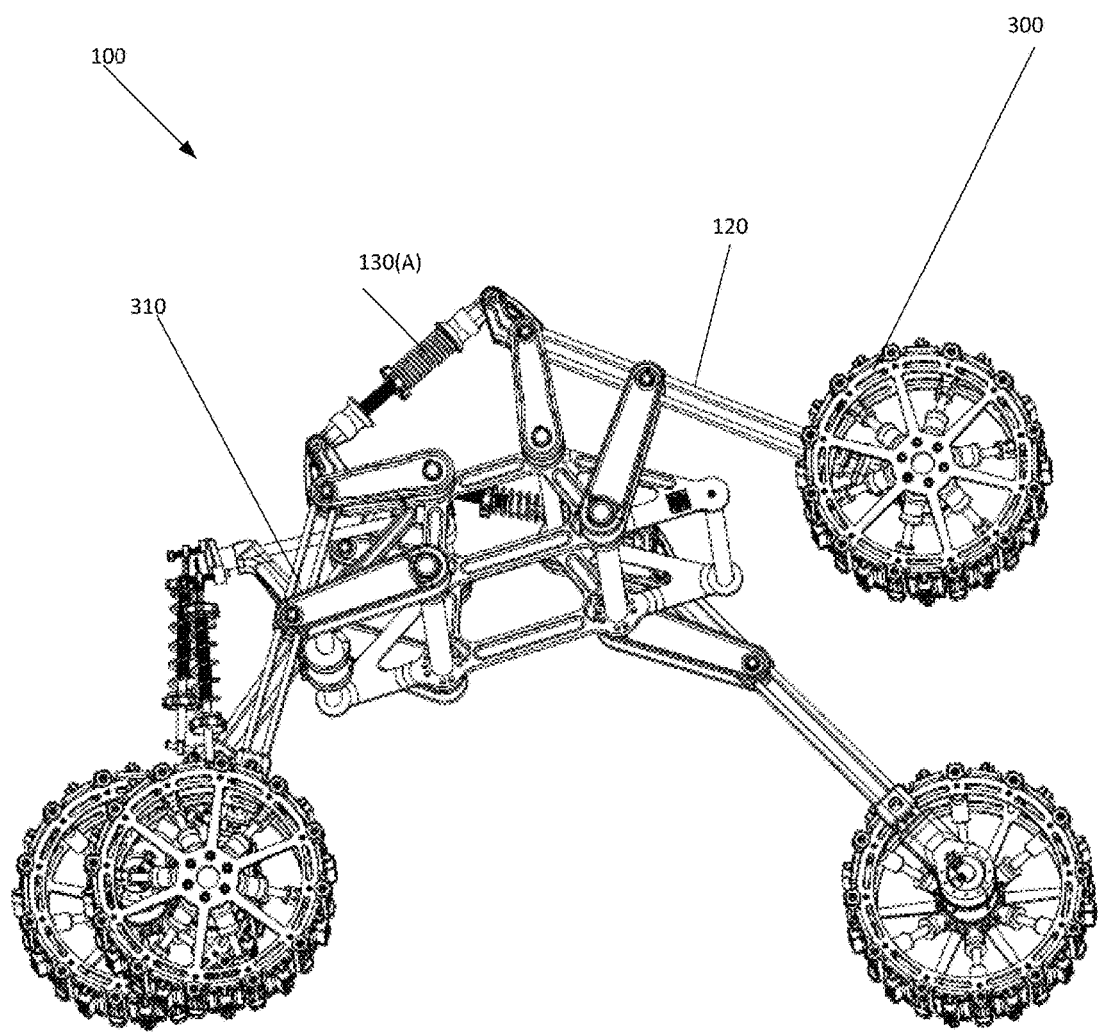
FIGS. 5 and 6 depict an embodiment of a vehicle with an articulating suspension exploration platform with shock dampening, according to an embodiment.
Figure 6:
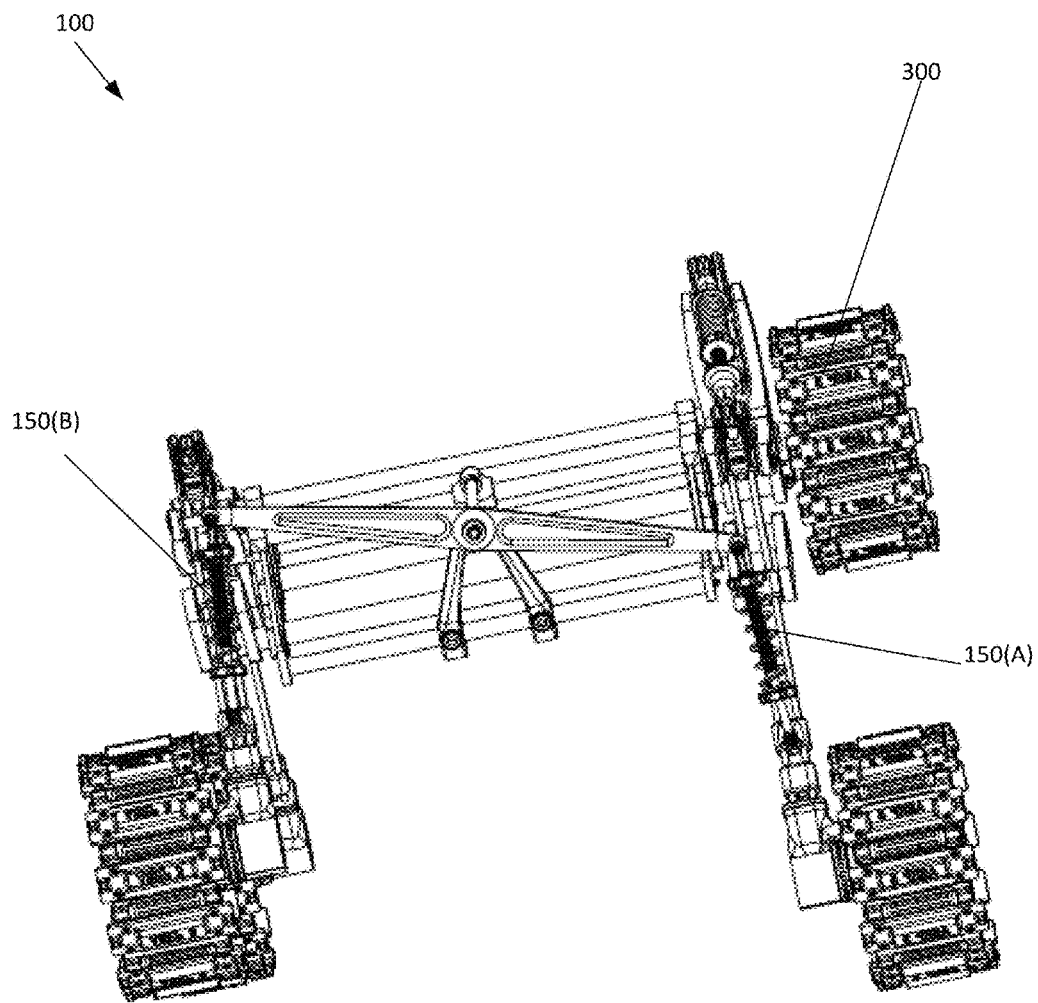

FIGS. 5 and 6 depict an embodiment of a vehicle 100 with an articulating suspension exploration platform with shock dampening, according to an embodiment.

As depicted in FIGS. 5 and 6, As forces are applied to wheel 300, shock dampener 130(A) may compress. By shock dampener 130(A) compressing, forces may be transferred from the front linkages 120 to the mirrored linkages 310 positioned at the rear of the vehicle 100. Because the shock dampener 130(A) directly couples the front linkage 120 and the mirrored linkages 310, the phase of force applied by the shock dampeners 130(A) to the front linkages 120 and mirrored linages 310 may be opposite each other. Furthermore, shock dampener 130(A) may apply the forces across the linkages across the same side of vehicle 100 before they are applied to the second side of vehicle 100.

Figure 8:
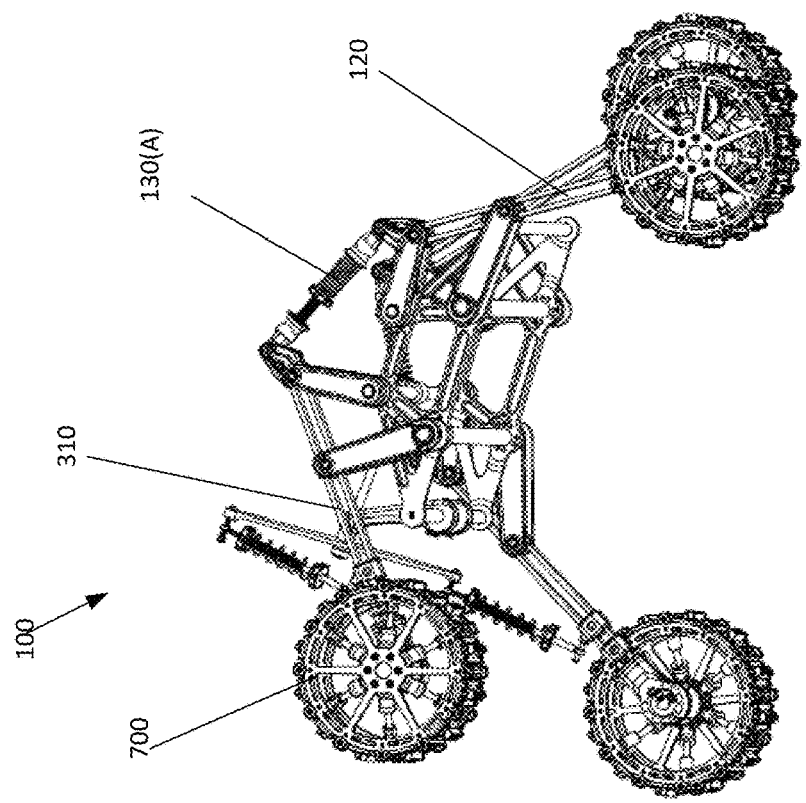
FIGS. 7 and 8 depict an embodiment of a vehicle with an articulating suspension exploration platform with shock dampening, according to an embodiment.
Figure 7:
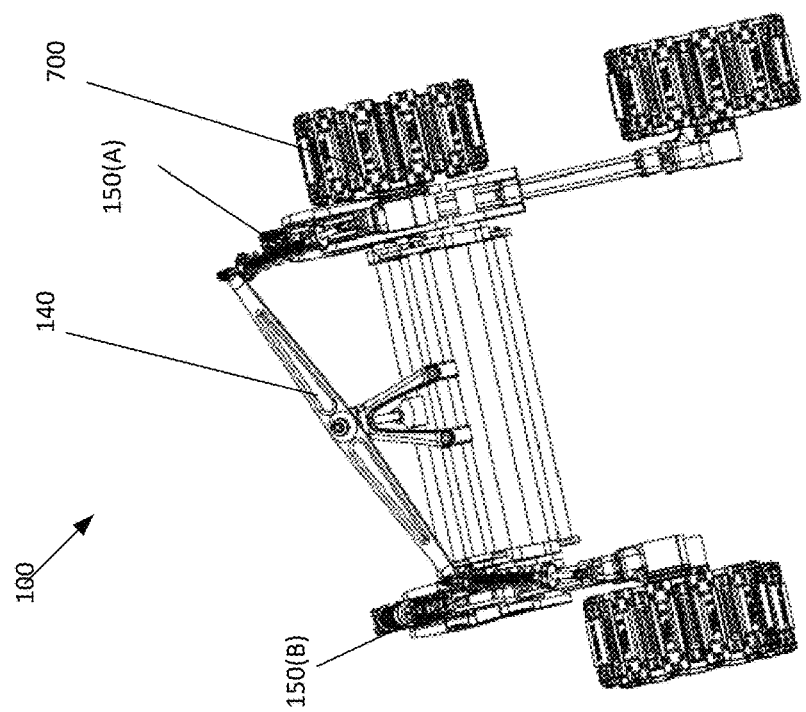

FIGS. 7 and 8 depict an embodiment of a vehicle 100 with an articulating suspension exploration platform with shock dampening, according to an embodiment.

As depicted in FIGS. 7 and 8, as rear wheel 700 is articulated due to forces being applied to rear wheel 700, the corresponding rear linkage 120 may transfer the forces applied to rear wheel 700 via first shock dampener 130(A) and second shock dampeners 150 utilizing rear stabilization bar 140. In embodiments, because the shock dampeners 150(A) and 150(B) are directly coupled to rear stabilization bar 140, the phase of force applied by the shock dampeners shock dampeners 150(A) and 150(B) may be opposite each other. Furthermore, because the shock dampener 130(A) directly couples the front linkage 120 and the mirrored linkages 310, the phase of force applied by the shock dampeners 130(A) to the front linkage 120 and mirrored linage 310 may be opposite each other. The forces applied to first shock dampener 130(A) may be applied simultaneously to shock dampeners 150(A) and 150(B) due to rear wheel 700 receiving force. This may be different than when front wheel 300 receives force.

Figure 9:
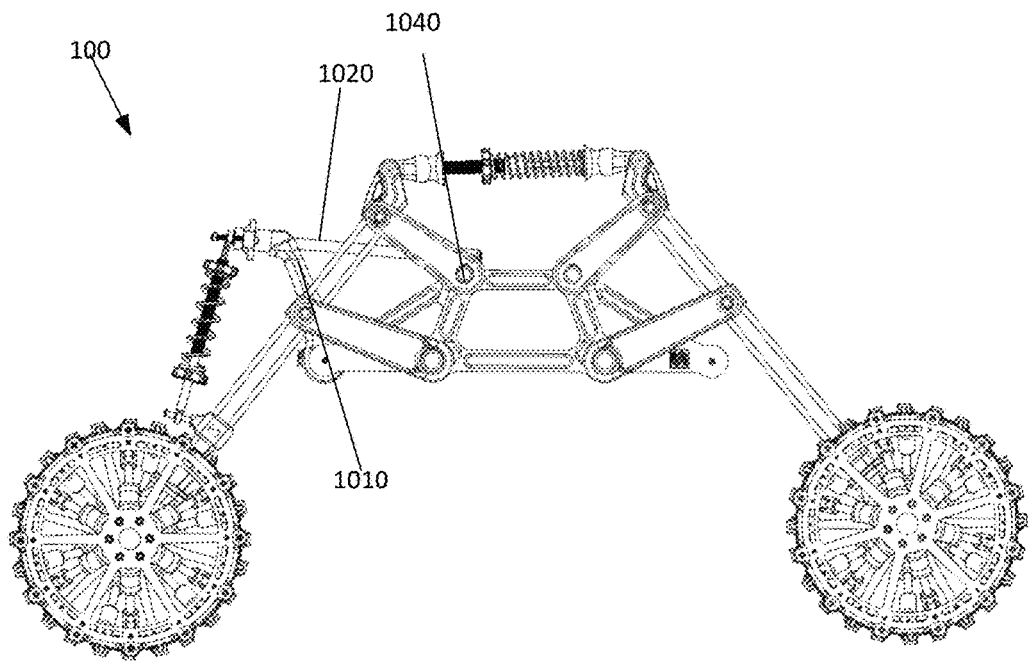
FIGS. 9 and 10 depict an embodiment of a vehicle with an articulating suspension exploration platform with shock dampening, according to an embodiment.
Figure 10:
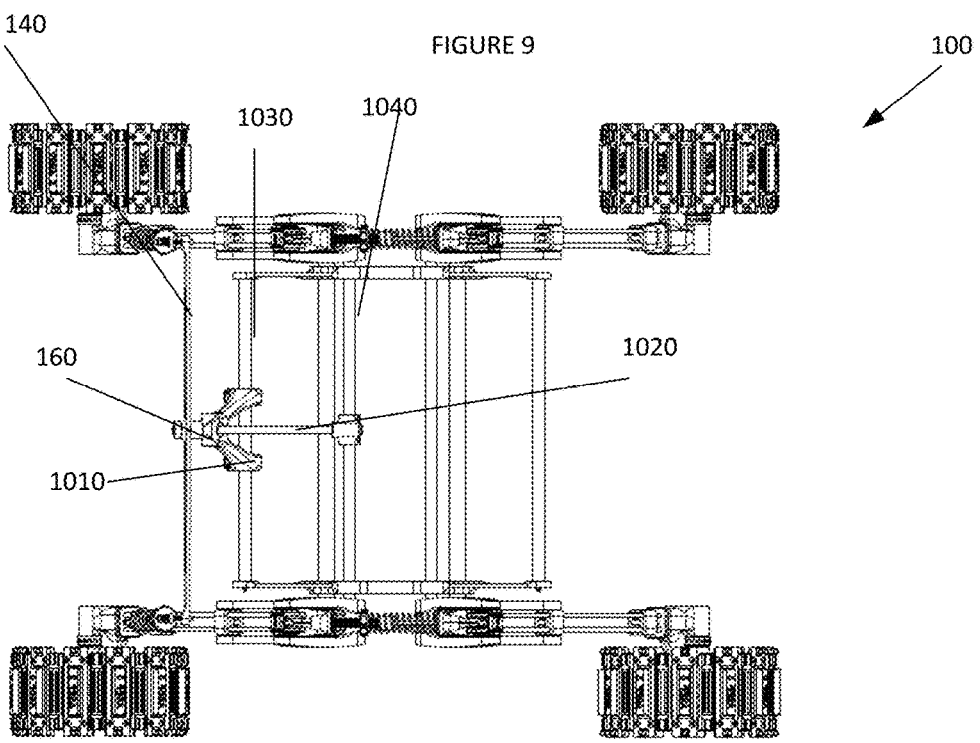

FIGS. 9 and 10 depict an embodiment of a vehicle 100 with an articulating suspension exploration platform with shock dampening, according to an embodiment.

As depicted in FIGS. 9 and 10, rear stabilizer support 160 may be a "T" connector with a first set of arms 1010 that are configured to be coupled to a rear most linkage bar 1030, and a second arm 1020 that is configured to couple with a rear and upper linkage bar 1040. Additionally, rear stabilizer support 160 may be configured to be coupled with rear stabilizer bar 140.

Due to the positioning of rear stabilizer support 160, rear stabilizer support 160 may retain rear stabilizer bar 140 in place while limiting the likelihood of vehicle 100 turning over. Rear stabilizer support 160 may transfer forces applied to rear stabilizer bar 140 to the chassis of the vehicle at multiple linkage bars through arms 1030, and 1040, wherein the linkage bars may be positioned at different horizontal and vertical offsets.

Figure 11:
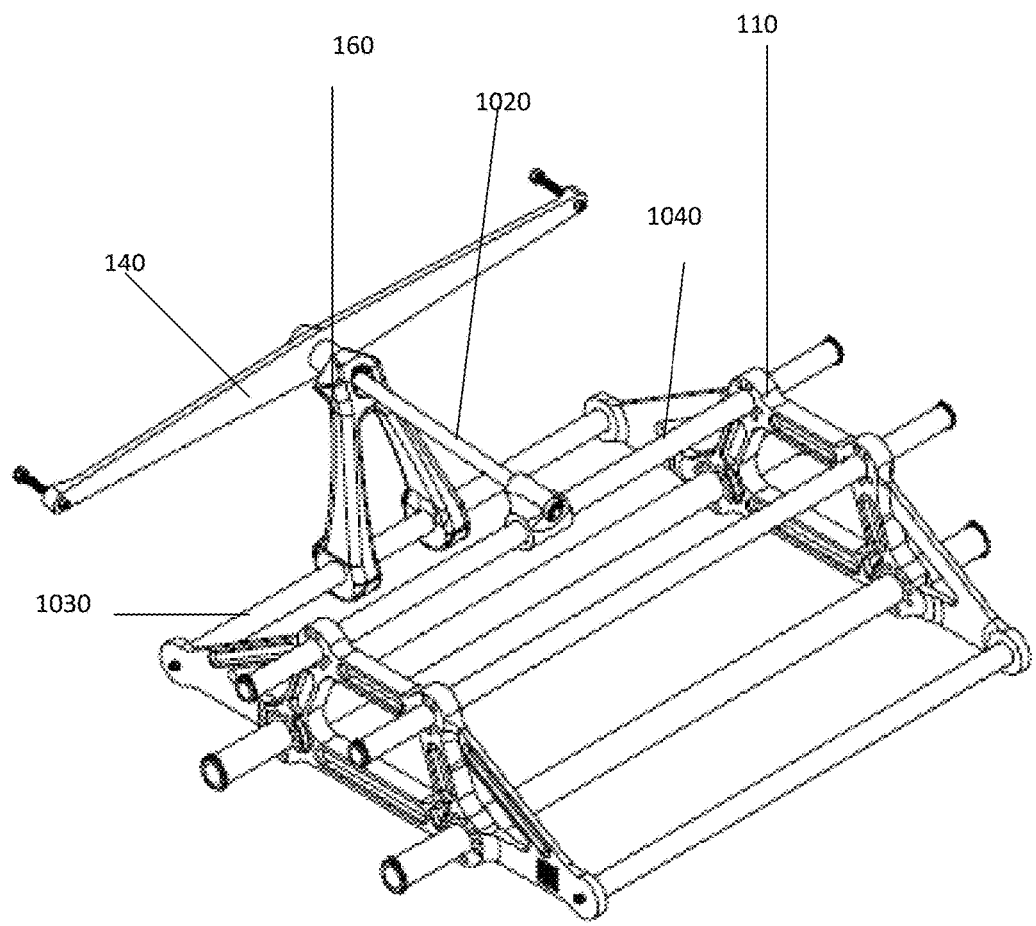
FIG. 11 depicts a perspective view of a chassis, rear stabilizer bar, and rear stabilizer support, according to an embodiment.

FIG. 11 depicts a perspective view of chassis 110, rear stabilizer bar 140, and rear stabilizer support 160, according to an embodiment. As depicted in FIG. 11, rear stabilizer bar 140 may be configured to rotate around an axis defined by arm 1020 of rear stabilizer support 160, which may be coupled to linkage 1040. The axis of rotation may be above a lower connection point of rear stabilizer support 160 to allow the rear wheels of the vehicle to be articulated and/or raised to higher angles.

Figure 12:
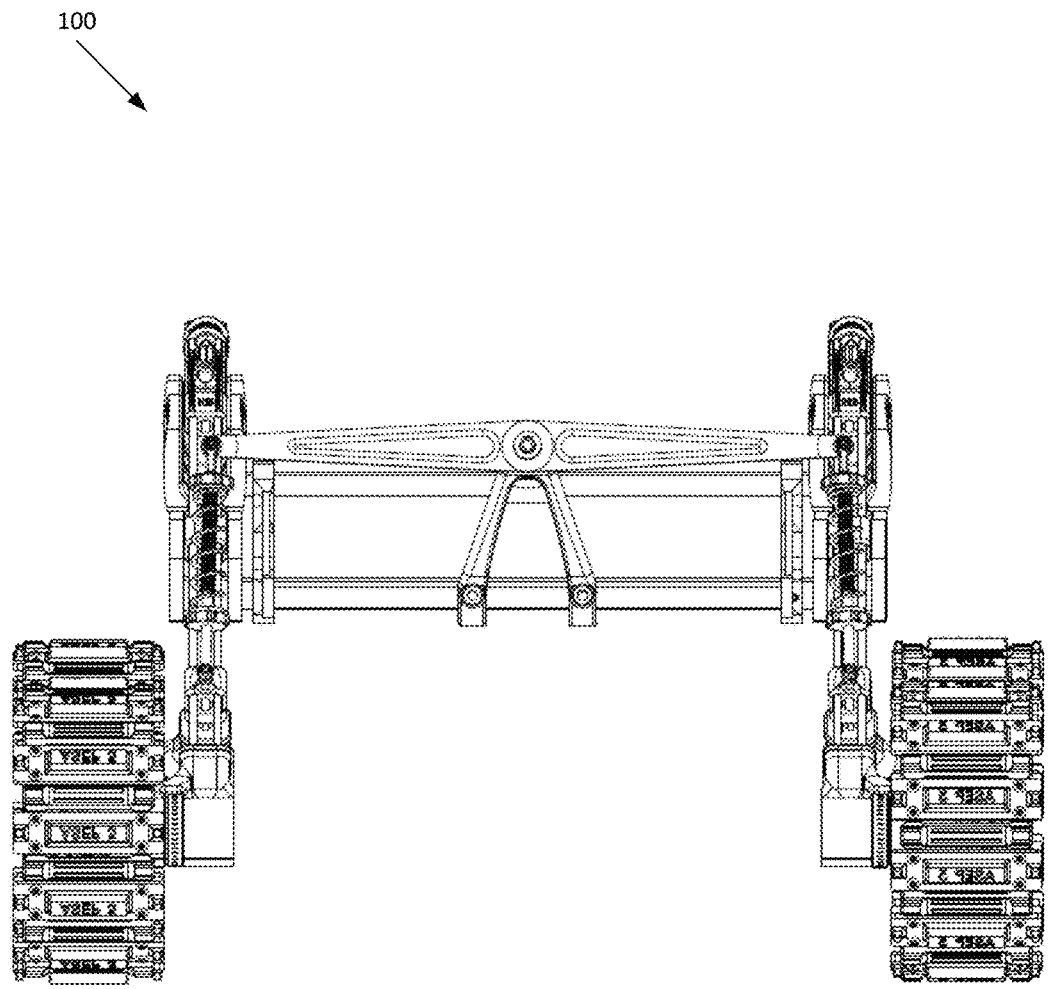
FIG. 12 depicts an embodiment of a vehicle with an articulating suspension exploration platform with shock dampening, according to an embodiment.

FIG. 12 depicts an embodiment of a vehicle 100 with an articulating suspension exploration platform with shock dampening, according to an embodiment.

Figure 13:
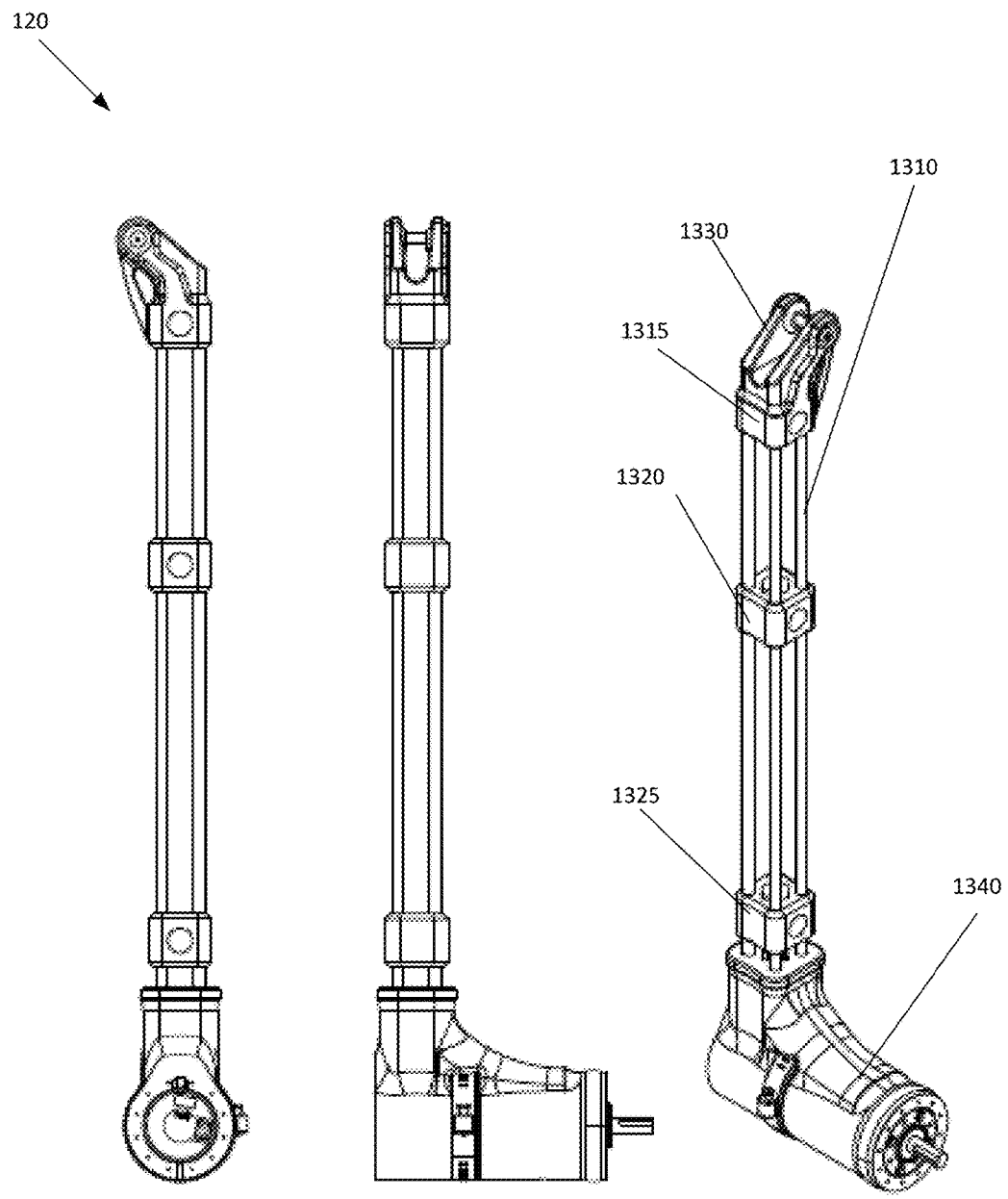
FIG. 13 depicts various views of a linkage bar, according to an embodiment.

FIG. 13 depicts various views of linkage bar 120, according to an embodiment.

As depicted in FIG. 13, linkage bar 120 may include a plurality of shafts 1310, coupling mechanisms 1315, 1320, first end 1330, and second end 1340.

The plurality of shafts 1310 may be cylindrical shafts that are configured to extend from first end 1330 to second end 1340, wherein spaces may be created between the plurality of shafts 1310. Plurality of shafts 1310 may be configured to disperse loads applied to first end of shaft 1330 from a shock absorber or from second end of shaft 1340 from a wheel.

Upper coupling mechanism 1315 may be positioned closer to first end of shaft 1330 than second end of shaft 1340, and lower coupling mechanism 1320 may be positioned closer to second end of shaft 1340 than first end of shaft 1330. Coupling mechanisms 1315, 1320, 1325 may include a plurality of vertical orifices that correspond to the plurality of shafts 1310, wherein the plurality of the shafts 1310 may pass through the orifices. The coupling mechanisms 1315, 1320, 1325 may allow the shafts 1310 to flex while retaining the same respect shape and layout.

Furthermore, coupling mechanisms 1315, 1320, 1325 may also include horizontal orifices. The horizontal orifices may be configured to receive arms (122, 124) of the linkages to couple linkage bar 120 to chassis 110. For example, coupling mechanism 1315 may be configured to be coupled with arm 124, while coupling mechanism 1320 may be coupled with arm 122. Furthermore, coupling mechanism 1325 may be configured to be coupled with second shock dampeners to couple rear wheels with a rear stabilization bar.

First end 1330 may be configured to be coupled with a first shock dampener at a first angle. The angle may be set such that the first shock dampener is at an angle horizontal to a floor surface when vehicle 100 is on a flat surface. This may enable a higher angle of articulation for each linkage 120.

Second end 1340 may be configured to be coupled with a wheel of the vehicle 100. The wheel of the vehicle 100 may be positioned outside of the linkage 120 to provide wider support of the chassis of vehicle 100 making vehicle 100 more stable.

Figure 14:
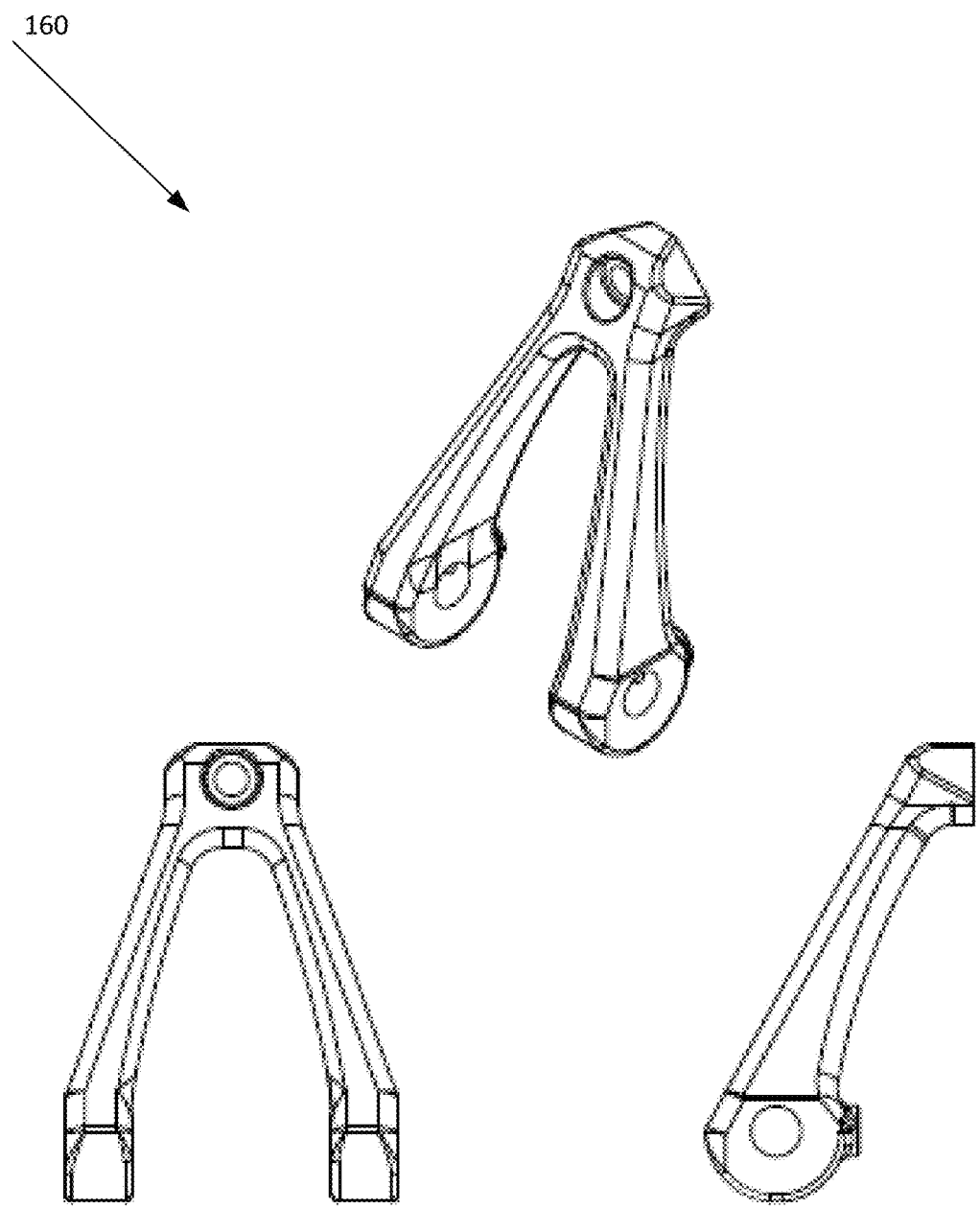
FIG. 14 depicts various view of a rear stabilizer support, according to an embodiment.

FIG. 14 depicts various view of rear stabilizer support 160, according to an embodiment.

Figure 16:
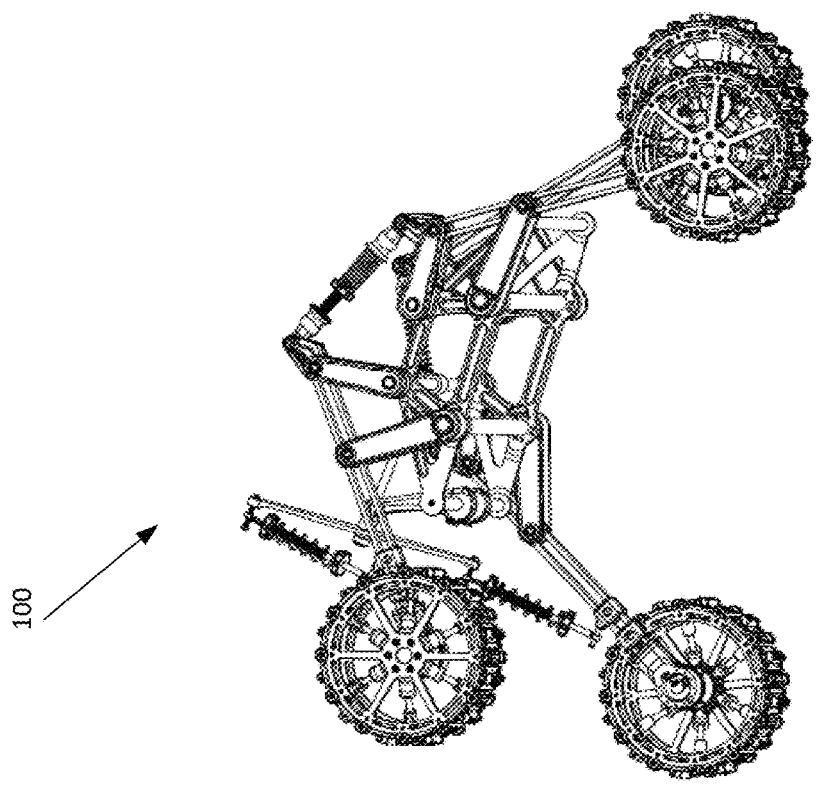
FIGS. 15 and 16 depict various view of a vehicle, according to an embodiment.
Figure 15:
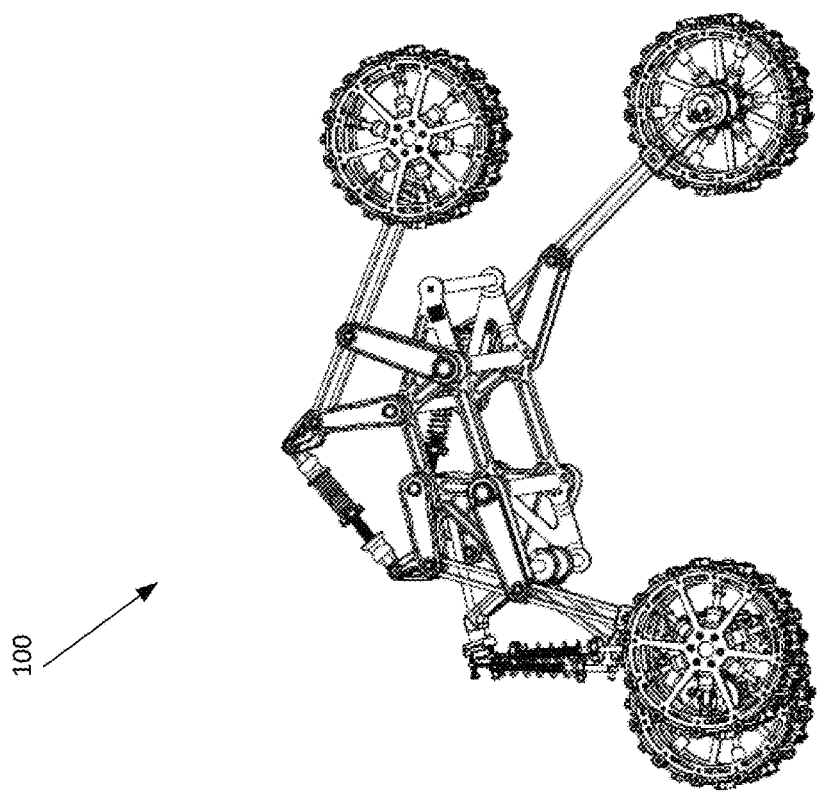

FIGS. 15 and 16 depict various view of a vehicle 100, according to an embodiment. As depicted in FIGS. 15 and 16 both the rear and front wheels may be configured to be articulated. The height of articulation may be more than three times a wheel diameter.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention.

Although the invention has been described with respect to specific embodiments thereof, these embodiments are merely illustrative, and are thus not restrictive of the invention. The description herein of illustrated embodiments of the invention is not intended to be exhaustive or to limit the invention to the precise forms disclosed herein (in particular, the inclusion of any particular embodiment, feature, or function is not intended to limit the scope of the invention to such embodiment, feature, or function).

Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A vehicle with an articulating suspension platform, the vehicle comprising:
   a chassis being a frame of the vehicle;
   a first linkage including a first arm and a second arm, the first arm and the second arm being configured to be coupled with the chassis at different locations, and the first arm and the second arm providing two pivot points to rotate the first linkage;
   a second linkage positioned on a same side of the vehicle as the first linkage;
   a first shock dampener configured to absorb shock impulses applied to the first linkage, the first shock dampener including a first end coupled with the first linkage, and a second end being coupled with the second linkage, wherein the first linkage is directly coupled to the second linkage only through the first shock dampener;
   a third linkage being positioned on an opposite side of the chassis as the first linkage and the second linkage;
   a rear stabilizer bar coupled with the third linkage and the second linkage, the rear stabilizer bar being positioned outside of the chassis.

2. The vehicle of claim 1, wherein the rear stabilizer bar includes a second shock dampener configured to absorb shock impulses applied to the second linkage.

3. The vehicle of claim 2, wherein the second shock dampener includes a first dampening device coupled to the rear stabilizer bar and the second linkage, and a second dampening device coupled to the rear stabilizer bar and the third linkage.

4. The vehicle of claim 3, further comprising:
   a rear stabilizer support configured to be coupled with the rear stabilizer bar, the rear stabilizer support including an arm that is configured to be coupled to a first shaft extending through the chassis in a direction that is perpendicular to the first, wherein the arm defines an angle of rotation of the rear stabilizer bar.

5. The vehicle of claim 4, wherein the rear stabilizer support includes second arms that are configured to be coupled to a second shaft extending through the chassis, the second shaft being vertically and horizontally offset from the first shaft.

6. The vehicle of claim 1, wherein a first force applied to the second linkage from the first shock dampener is in opposite phase to a second for applied to the first linkage from the first shock dampener.

7. The vehicle of claim 1, further comprising:
a fourth linkage;
a third linkage;
a second shock dampener configured to absorb shock impulses applied to the fourth linkage, the second shock dampener including a first end coupled with the fourth linkage, and a second end being coupled with the third linkage.

8. The vehicle of claim 1, wherein the first shock dampener is a linear actuator.

9. The vehicle of claim 1, wherein the first shock dampener is positioned above the chassis and in a direction that is in parallel to a ground surface if the ground surface is flat and the vehicle is positioned on the ground surface.

10. The vehicle of claim 1, wherein the first arm and the second arm are configured to allow the first linkage to move in a linear path.

11. A vehicle with an articulating suspension platform, the vehicle comprising:
a chassis being a frame of the vehicle;
a first linkage including a first arm and a second arm, the first arm and the second arm being configured to be coupled with the chassis at different locations, and the first arm and the second arm providing two pivot points to rotate the first linkage;
a second linkage positioned on a same side of the vehicle as the first linkage;
a first shock dampener configured to absorb shock impulses applied to the first linkage, the first shock dampener including a first end coupled with the first linkage, and a second end being coupled with the second linkage, wherein the first linkage is directly coupled to the second linkage only through the first shock dampener, wherein the chassis is symmetrical in shape.

12. A vehicle with an articulating suspension platform, the vehicle comprising:
a chassis being a frame of the vehicle;
a first linkage including a first arm and a second arm, the first arm and the second arm being configured to be coupled with the chassis at different locations, and the first arm and the second arm providing two pivot points to rotate the first linkage;
a second linkage positioned on a same side of the vehicle as the first linkage;
a first shock dampener configured to absorb shock impulses applied to the first linkage, the first shock dampener including a first end coupled with the first linkage, and a second end being coupled with the second linkage, wherein the first linkage is directly coupled to the second linkage only through the first shock dampener, wherein the first shock dampener is a spring.

* * * * *